March 7, 1961 R. J. HENNELLS 2,973,744
CUSHIONING STRUCTURE FOR FLUID ACTUATED CYLINDER
Filed March 9, 1960
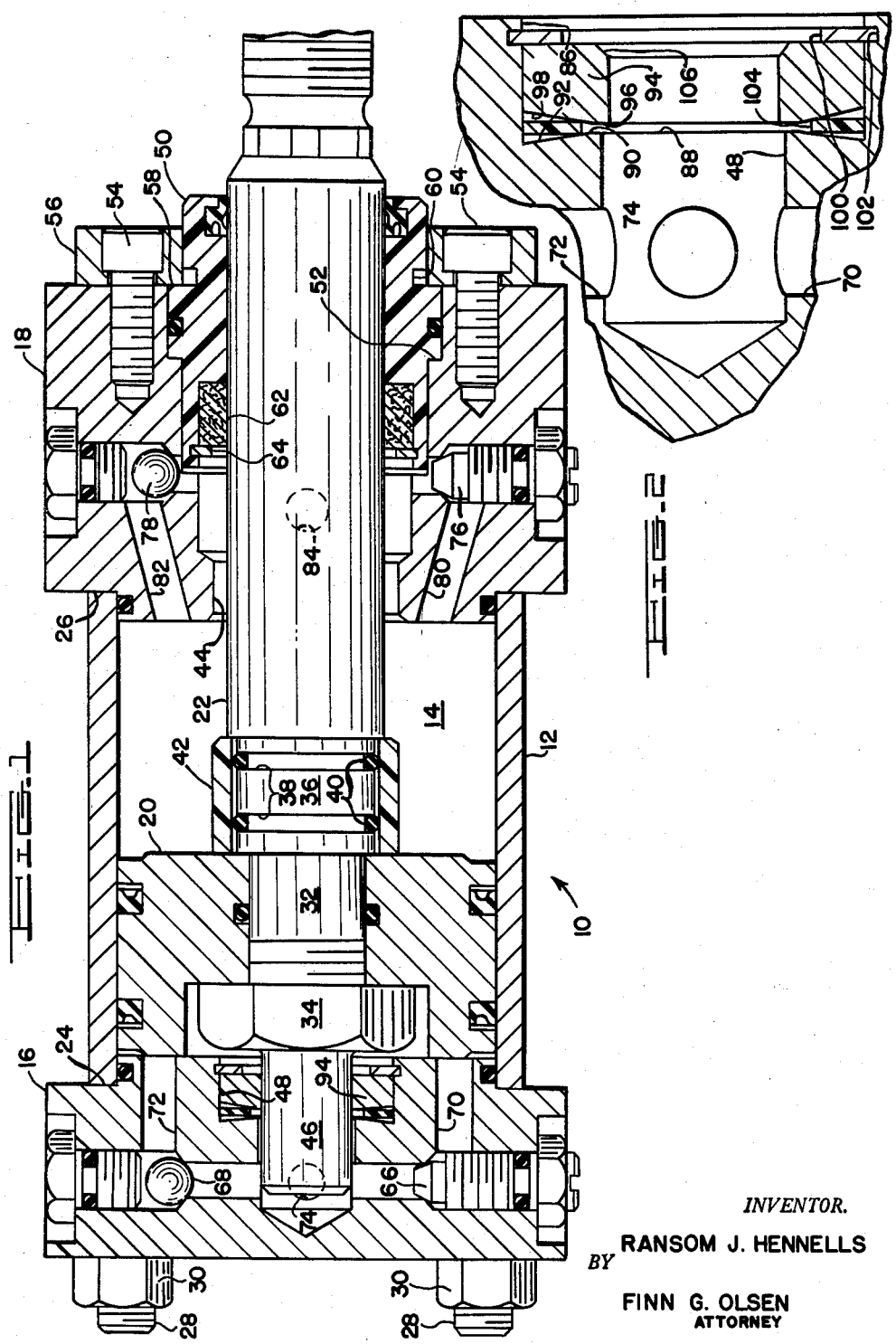
INVENTOR.
RANSOM J. HENNELLS
BY
FINN G. OLSEN
ATTORNEY

United States Patent Office 2,973,744
Patented Mar. 7, 1961

2,973,744

CUSHIONING STRUCTURE FOR FLUID ACTUATED CYLINDER

Ransom J. Hennells, Plymouth, Mich., assignor to W. E. Hennells Company, Ann Arbor, Mich., a corporation of Michigan Filed Mar. 9, 1960, Ser. No. 13,887

8 Claims. (Cl. 121—38)

The present invention relates to fluid actuated cylinders, and more particularly to a structure for cushioning the piston of the cylinder at one or both ends of its stroke to prevent impact of the piston against the heads.

Fluid actuated cylinders of this character are provided with a reciprocable piston and rod which are adapted to reciprocate within a cylindrical chamber having heads at the ends thereof. The heads have means for admitting and exhausting fluid from said cylindrical chamber to drive the piston and rod. A structure for cushioning the piston at the end of its stroke is also provided. This is generally accomplished by employing an extension from the piston and rod, which extension is adapted to penetrate an exhaust port to trap some of the fluid between the piston and the head. In this arrangement, a bushing or similar device is generally carried within the exhaust port for receiving the extension and for effecting a fluid seal between the extension and the bore of the exhaust port. This type of arrangement creates problems relative to providing effective seals and also to providing devices having relatively long, trouble-free lives when in operation. In this respect, one of the principal difficulties that has arisen with the prior art devices is the wear that will occur on the bushing and associated extension or the complete failure that may occur if there is a misalignment of the associated parts.

It is an object of the present invention to provide an improved cushioning structure for a fluid actuated cylinder of the foregoing character, said cushioning structure being constructed and arranged to accommodate misalignment of said extension and said bushing and to do so without causing unnecessary wear or damage to the bushing and its associated extension.

It is still another object of the present invention to provide a cushioning structure of the foregoing character which has an improved arrangement whereby a resilient packing is retained between the bushing and the bore in the head so that an effective seal is provided therebetween irrespective of movements of the bushing to accommodate misalignment between the bushing and its associated extension.

It is still another object of the present invention to provide a cushioning structure of the foregoing character wherein the construction and arrangement of the bushing, the bore in which the bushing is positioned and the packing therebetween is such as to permit axial, lateral and universal movement of the bushing relative to the bore.

It is still another object of the present invention to provide a cushioning structure of the foregoing character wherein the resilient packing is effective to provide a progressively tighter seal between the bushing and its associated bore when the rate of leakage of fluid therebetween is caused to be increased at the end of the stroke of the piston.

Other objects of this invention will appear in the following description and appended claims, reference being had to the accompanying drawings forming a part of this specification wherein like reference characters designate corresponding parts in the several views.

In the drawings:

Figure 1 is a longitudinal section through a fluid actuated cylinder embodying the present invention; and Figure 2 is an enlarged fragmentary section showing the details of the improved cushioning structure.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The fluid actuated cylinder 10 comprises the cylinder 12 defining therein the cylindrical chamber 14, heads 16 and 18 at opposite ends of the cylinder 12, and a piston 20 and rod 22 adapted to reciprocate in the cylinder 12 and heads 16 and 18. The heads 16 and 18 have shoulders 24 and 26 for receiving the ends of the cylinder 12, and the heads 16 and 18 are secured together with the cylinder by means of the tie bolts 28 and nuts 30.

The piston 20 is mounted on a reduced diameter portion 32 on the rod 22 and is retained in place thereon by the nut 34. Another reduced diameter portion 36 is provided with two annular grooves 38 which carry suitable O-rings 40 on which is carried a bushing 42 for entering a bore 44 provided in the head 18. An extension 46 of the rod 22 projects from the piston 20 for entering the bore 48 provided in the head 16.

A journal 50 is provided for the rod 22 and is seated at 52 in the head 18. The journal 50 is retained in place by screws 54 and the associated retainer 56 which overlies the shoulder 58 of journal 50. For the purpose of facilitating removal of the journal 50, a groove 60 is provided therein for receiving a pry-off tool. A suitable rod packing 62 is retained in place between journal 50 and rod 22 by means of the retaining ring 64.

Suitable valve means and passageways are located in each of the heads 16 and 18 to control flow of fluid to and from the cylindrical chamber 14. In the illustrated embodiment of the invention, the head 16 has an adjustable needle valve 66 and a ball check valve 68 which are in passageways 70 and 72, respectively, providing fluid communication between the cylindrical chamber 14 and the port 74 through which fluid can flow to and from the cylindrical chamber 14. Likewise, the head 18 has a needle valve 76 and ball check valve 78 which are in passageways 80 and 82, respectively, providing fluid communication between the cylindrical chamber 14 and the port 84 through which fluid can flow to and from the cylindrical chamber 14.

The operation of the structure described above will now be generally described. As viewed in Figure 1, assume that fluid is entering port 74. This will result in fluid flowing through passageway 72, by check valve 68 which will be lifted by the pressurized fluid, and into cylindrical chamber 14 on the left side of piston 20 causing the piston 20 and its rod 22 to move to the right. When the piston 20 moves to the right, the fluid in chamber 14 on the right side of the piston 20 will be discharged through port 84 by way of any of the three passageways or bores 44, 80 and 82. However, the passageway 82 will be closed by virtue of the fluid pressure acting downward on the check valve 78, and only a limited and controlled amount of fluid will flow past the needle valve 76. Thus, the main discharge route for the fluid will be via the bore 44, but this can occur only until the bushing 42 penetrates the bore 44, and thereafter, the fluid remaining between the right face of piston 20 and the left face of head 18 will act to cushion the traveling piston 20. The bushing 42 and its associated O-rings 40 cooperate with the bore 44 to prevent discharge of fluid other than via the passageway 80 and needle valve 76 when the piston 20 is being cushioned in the described manner.

Assuming now that the flow of fluid to the cylinder 10 is reversed so that fluid under pressure is introduced through port 84 and port 74 serves as a discharge port. The pressurized fluid will then flow through passageway 82, lifting check valve 78, and to a limited extent will flow through passageway 80 past needle valve 76 into the cylindrical chamber 14 causing the piston 20 and its rod 22 to move to the left. When bushing 42 is clear of the bore 44, pressurized fluid can also flow from bore 44. The fluid in chamber 14 on the left side of piston 20 will be displaced therefrom and will flow through bore 48 to port 74 and also via passageway 70 past needle valve 66 to the same port 74. Under these circumstances, flow through passageway 72 will be checked by check valve 68. The cushioning of the piston 20 will commence when the extension 46 enters the bore 48, and at this time flow through bore 48 will be interrupted so that the only discharge from the left end of cylindrical chamber 14 will be that flowing through passageway 70 as permitted by needle valve 66.

One of the important features of the present invention is the construction of the bore 48 and its associated parts for receiving the extension 46 and for effecting a suitable seal between the extension 46 and the bore 48 irrespective of any slight misalignment that may occur between these parts. For an explanation of this cushioning structure, reference is made to the enlargement shown in Figure 2. As there shown, the bore 48 has an enlarged outer portion 86 which extends to the annular end wall 88 which has a radially inner portion 90 normal to the axis of bore 48 and a radially outer portion 92 which is flared away from the open end of bore 48. In the preferred embodiment shown, this portion flares away from the normal portion by an angle of about 7½ degrees.

Positioned in the enlarged outer portion 86 of bore 48 is a loose fitting annulus or bushing 94 which normally is formed of bearing bronze or a similar metal. The bushing 94 has an end face with an inner portion 96 normal to the bushing axis and an outer portion 98 which is flared toward the open end of the bore 48. The inner diameter has a dimension such that it fits closely to the extension 46, as can be seen in Figure 1, thereby preventing fluid flow between these mating parts.

The bushing 94 is retained in place in the bore 48 by the retaining ring 100 which is removably fitted into the groove 102 in bore 48. Positioned between the bushing 94 and the annular end wall 88 is a flat rubber washer or packing 104. This packing 104 has its outer periphery against the radially outer wall portion 86 and its inner periphery is slightly larger than the radially outer edges of the normal portions 90 and 96 of the end wall 88 and bushing 94, respectively. Thus, the normal radially inner portions 90 and 96 can be abutted together by forces, such as would be exerted by advancing extension 46, and the packing 104 will be compressed within an annular chamber defined by flared portions 92 and 98 and the enlarged portion 86 of bore 48.

In the operation of this cushioning structure, the bushing 94 will initially be held in the position shown in Figure 2. Thus, it will be frictionally retained between the packing 104 and the retaining ring 100. Assuming the piston 20 and its rod 22 are moved from the right to the left of the cylindrical chamber 14, the extension 46 will enter the bushing 94 closing off the flow of fluid through the bushing 94. At the same time the bushing 94 will be displaced to the left until the normal portions 90 and 96 abut against one another, and the fluid which otherwise might leak to a limited extent between the outer periphery of bushing 94 and the enlarged portion 86 of bore 48 will be prevented from doing so by the packing 104 which will be urged radially inwardly by the pressurized fluid to form a tight seal at the radially inner ends of the flared portions 92 and 98. Thus, a very effective seal is provided, and even though the packing 104 may become worn after extended use, the desired seal will always be maintained because of the action of the pressurized fluid acting to urge the packing 104 into the radially inner apex of the annular chamber formed between the flared portions 92 and 98. On the return stroke of piston 20, the extension 46 will be withdrawn from the bushing 94 and the latter will be returned by the resilient properties of the packing 104 to the position shown in Figure 2.

Thus, as described above, when the piston 20 is advancing to the left, fluid can initially flow through bore 48 and to a limited extent through passageway 70 to port 74. As soon as the extension 46 penetrates bushing 94 flow through bore 48 will be interrupted thereby effecting a cushioning action for the piston 20, and during this phase of operation flow of fluid to port 74 can occur only through passageway 70. When the flow of fluid is reversed, fluid can flow through passageways 70 and 72 until the extension 46 is withdrawn from bushing 94 after which fluid can also flow through bore 48.

Another of the features of the cushioning structure described is the manner in which it can accommodate misalignments that may occur in the rod 22 and extension 46. In the event the extension 46 should be out of axial alignment with bore 48, the beveled front edge of the advancing extension 46 will engage the beveled edge 106 of the bushing 94 causing the bushing to be displaced laterally so that the extension 46 can penetrate the bushing 94. Thereafter, when the extension 46 is withdrawn on the return stroke of piston 20, the bushing 94 will be retained in the laterally displaced position so that on succeeding strokes of the piston 20, the extension 46 will fit directly into bushing 94, because the packing 94 and retaining ring 100 will cooperate in frictionally holding the bushing 94 in its laterally displaced position. Thus, there will be avoided any repeated striking or hammering of the bushing 94 because of misalignment of the extension 46.

In the described cylinder suitable sealing means such as O-rings and packing means are provided which are conventional in character, and consequently they have not been separately described.

Having thus described my invention, I claim:

1. In a cylinder construction having a reciprocable piston and rod, means forming a cylindrical chamber within which said piston is adapted to reciprocate, cylinder heads at the ends of the chamber, means in the heads for admitting and exhausting fluid from said chamber to drive said piston and rod, and structure for cushioning said piston and rod at the end of their stroke toward one head, said structure comprising a cylindrical bore formed in one head coaxial with said piston and rod and having a generally radially inwardly extending annular end wall, said end wall having a radially inner portion generally normal to the axis of said cylindrical bore and a radially outer portion flared away from the normal portion to provide a recess in the end wall, a loosely fitting removable bushing in said bore with one end thereof adjacent said end wall, said bushing having a radially inner portion generally normal to the axis of said cylindrical bore and adapted to engage the radially inner portion of said end wall and a radially outer portion flared away from said end wall so that an annular chamber is defined between the radially outer portions of said end wall and said bushing when said radially inner portions are in engagement, the piston and rod having an extension telescopingly entering into said bushing at the end of said stroke to prevent fluid from exhausting through said bushing, and packing means between the radially outer portions of said end wall and said bushing adapted to be urged radially inwardly to prevent escape of fluid between said bushing and said bore.

2. In a cylinder construction, a structure as claimed in claim 1 wherein said packing means comprises a flat resilient washer having an internal diameter about the same as the outer diameter of the radially inner portion of said bushing.

3. In a cylinder construction, a structure as claimed in claim 1 wherein the radially outer portions of said end wall and said bushing are each flared about 7½ degrees from a normal to the axis of said cylindrical bore.

4. In a cylindrical construction, a structure as claimed in claim 1 wherein the radially outer portions of said end wall and said bushing are each flared about 7½ degrees from a normal to the axis of said cylindrical bore, and said packing means comprises a flat resilient washer having an internal diameter about the same as the outer diameter of the radially inner portion of said bushing.

5. In a cylindrical construction, a structure as claimed in claim 1 wherein said bushing is retained in position against said packing means by a snap ring mounted in the entrance of said cylindrical bore.

6. In a cylindrical construction having a reciprocable piston and rod, means forming a cylindrical chamber within which said piston is adapted to reciprocate, cylinder heads at the ends of the chamber, means in the heads for admitting and exhausting fluid from said chamber to drive said piston and rod, and structure for cushioning said piston and rod at the end of their stroke toward one head, said structure comprising a cylindrical bore formed in one head coaxial with said piston and rod and having a generally radially inwardy extending annular end wall, a loosely fitting removable bushing in said bore with one end thereof adjacent said end wall, the piston and rod having an extension adapted to enter said bushing at the end of said stroke to prevent fluid from exhausting through said bushing, the adjacent one end of the bushing and the end wall cooperating when the bushing engages the end wall to define an annular chamber therebetween converging from the radially outer to the radially inner confines thereof, and packing means in said annular chamber adapted to be urged radially inwardly to prevent fluid from exhausing between said bushing and said bore.

7. In a cylindrical construction having a reciprocable piston and rod, means forming a cylindrical chamber within which said piston is adapted to reciprocate, cylinder heads at the ends of the chamber, means in the heads for admitting and exhausting fluid from said chamber to drive said piston and rod, and structure for cushioning said piston and rod at the end of their stroke toward one head, said structure comprising a cylindrical bore formed in one head coaxial with said piston and rod and having a generally radially inwardly extending annular end wall, a loosely fitting removable bushing in said bore with one end thereof adjacent said end wall, the piston and rod having an extension adapted to enter said bushing at the end of said stroke to prevent fluid from exhausting through said bushing, said bushing being laterally displaceable to accommodate misalignment of said extension, the adjacent one end of said bushing and said end wall cooperating when the bushing engages the end wall to define an annular chamber therebetween converging from the radially outer to the radially inner confines thereof, annular packing means in said annular chamber, and a snap ring in the entrance end of said bore engaging the other end of said bushing and retaining said bushing in frictional engagement with said packing means so that when said bushing is laterally displaced by a misaligned extension the bushing will thereafter be held in the displaced position by said packing means and said snap ring.

8. In a cylindrical construction, a structure as claimed in claim 7 wherein said packing means comprises a flat rubber-like washer adapted to be urged radially inwardly to prevent fluid from exhausting between said bushing and said bore.

References Cited in the file of this patent
UNITED STATES PATENTS

| 2,493,602 | Sterrett | Jan. 3, 1950 |
| 2,853,974 | Hewitt | Sept. 30, 1958 |